United States Patent [19]

Vinokur

[11] Patent Number: 4,730,367
[45] Date of Patent: Mar. 15, 1988

[54] APPARATUS AND METHOD FOR PRODUCING SAUSAGES

[75] Inventor: Isaac Vinokur, Buenos Aires, Argentina

[73] Assignee: Envaril, S.A., Buenos Aires, Argentina

[21] Appl. No.: 910,723

[22] Filed: Sep. 22, 1986

[30] Foreign Application Priority Data

Sep. 26, 1985 [AR] Argentina .............................. 301.744

[51] Int. Cl.$^4$ .......................................... A22C 11/10
[52] U.S. Cl. .......................................... 17/49; 17/33; 53/550; 53/549
[58] Field of Search ............... 17/33, 49; 53/450, 550, 53/549

[56] References Cited

U.S. PATENT DOCUMENTS

| | | | |
|---|---|---|---|
| 2,638,624 | 5/1953 | Wade | 17/33 |
| 4,109,792 | 8/1978 | Greenawalt et al. | 53/450 X |
| 4,112,546 | 9/1978 | Müller | 17/49 |
| 4,295,322 | 10/1981 | Kuipers | 53/450 |
| 4,479,283 | 10/1984 | Hollingsworth | 17/49 |
| 4,563,792 | 1/1986 | Niedecker | 17/33 |

*Primary Examiner*—Willie G. Abercrombie
*Attorney, Agent, or Firm*—Lackenbach Siegel Marzullo & Aronson

[57] ABSTRACT

In an apparatus and a method for producing sausages, an apparatus comprising a tubular member for feeding a flowable meat mass and a roll of a strip like film mounted thereon, bending means axially mounted around said tubular member for converting the strip-like film into a tubular film with the side edges of the film in overlapping relationship, welding means adjacent the outlet of the bending means for welding the overlapping side edges, said tubular member having an ejector end for supplying meat into the casing, while the tubular member, the film during shaping and the welding means simultaneously rotate, to thus rotatably feed the casing containing the meat-mass into rectilinearly moving clamping means to form a string of sausages. The method including the steps of feeding, by a forward movement, a strip-like film into bending means for converting it into a tubular film by overlapping the side edges of the strip-like film, welding said edges and supplying a flowable meat-mass into the casing, these steps being carried out while rotating the strip-like film, which is being transformed into a casing and interrupting the rotation, but not be forward movement, at successive predetermined lengths of the meat-filled casing by there clamping the casing to thereby form spaced apart twisted gaps and as a consequence a string of sausages.

6 Claims, 3 Drawing Figures

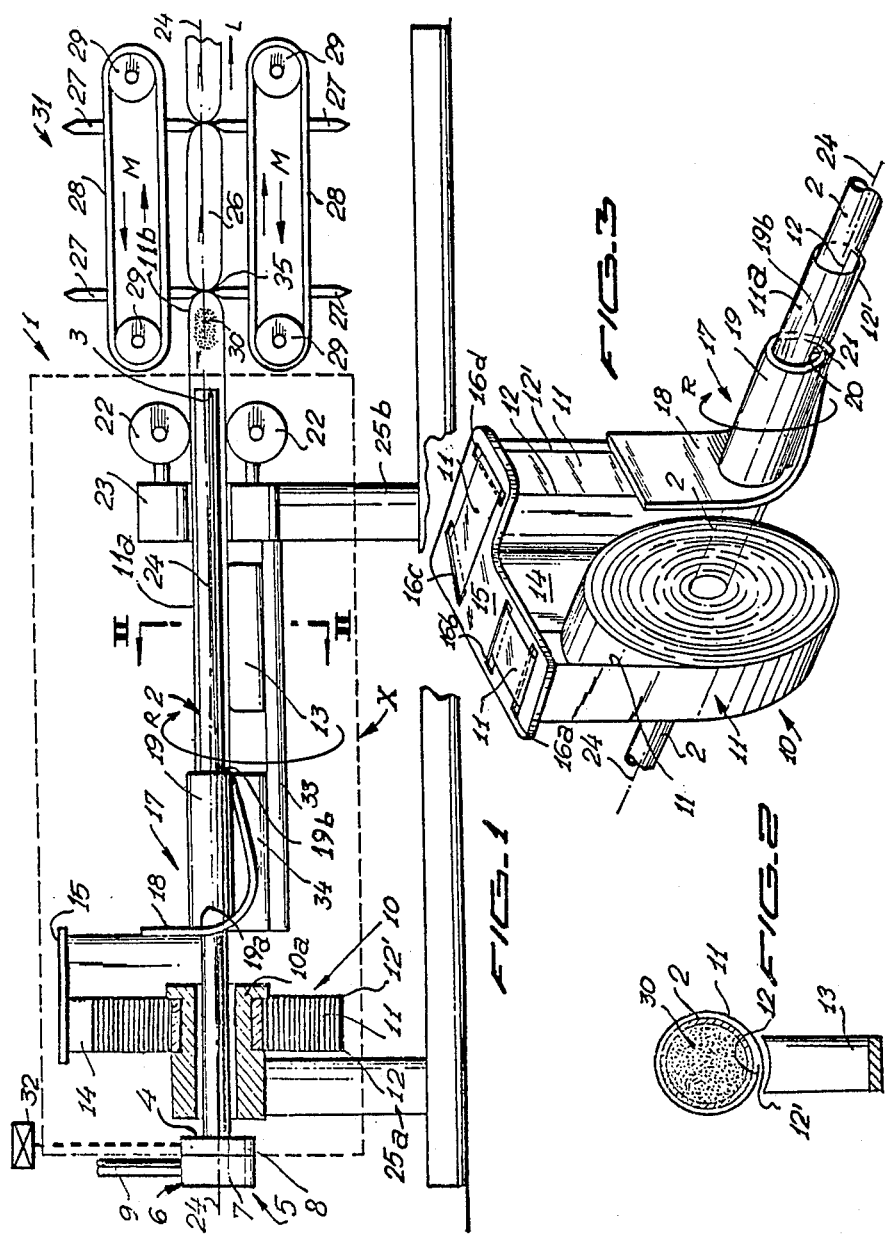

APPARATUS AND METHOD FOR PRODUCING SAUSAGES

FIELD OF THE INVENTION

The present invention relates to an apparatus and method for producing sausages and more particularly to manufacture of strings of sausages consisting of meat enclosed in a thin film casing. Such product may be further subject to a cooking step and thereafter the casing may be removed to achieve as final product skinless sausages.

The apparatus as well as the method of the present invention enable a direct and continuous production of long strings of sausages by using a planar strip-like film, which during the process is converted into a tubular casing, providing the necessary means to maintain the shape of the sausage. High speed and continuous production is possible, which remarkably decreases the manufacturing costs.

DESCRIPTION OF THE PRIOR ART

As is well known to those skilled in the art, sausages in general, as well as those sausages known as skinless sausages, are produced by injecting a flowable, hashed meat mass into a tubular film casing closed at one end. The meat mass is supplied by a generally tubular injector into the tubular film which is previously axially stored around this tubular injector. To enable to store a long tubular film casing on a rather short tubular injector, some 30 m long tubular casings are first plied along their longitudinal axes, like an accordian, in order to form short and rectilineal "corrugated cartridges" of 30 cm length. Each cartridge is closed at one end upon being fit onto the tubular member of the injector. After the 30 m casing being filled, the process and machine has to be stopped and cleaned prior to feeding another cartridge onto the tubular member. These steps are time-consuming. To produce this cartridge, a plurality of manufacturing steps are necessary. First a tubular film of 30 m length has to be produced. Then, this tubular film is plied in order to form a compact cartridge of 30 cm length. This is expensive and time consuming.

Another problem concerning the use of such a kind of cartridge is that after a certain time of storage, some adjacent folds get bonded to each other. As a consequence, during the filling, the tubular film becomes stressed at the bonded portions upon having to unfold, and thus tearing the casing. This requires stopping the production, to house a new cartridge on the injector, prior pertinent cleaning. The cost increases thereby also due to the loss of the wasted material.

BACKGROUND OF THE INVENTION

It is an aim of the present invention to provide a continuous manufacturing process and pertinent apparatus, which does not require the use of cartridges nor to fit previously manufactured tubular members onto the meat mass tubular injector.

In other words, a continuous manufacturing system is suggested, which in addition provides means whereby no undesirable bonding of parts of the tubular casing may take place.

SUMMARY OF THE INVENTION

The present invention provides a method and an apparatus which enables to continuously manufacture sausages using a roll of a planar strip-like film of a suitable material which, at the same time as the meat mass is ejected, is transformed into a tubular container or sheath, hereinafter called casing which is formed around the tubular meat injector and conveyed ahead thereof to a constricting assembly to form a string of sausage units. The strip-like film is transformed into a casing having a longitudinal joint, which is sealed ahead of the meat filling step.

The apparatus of the present invention provides the necessary means to convert a strip-like film, which is cheaper than the cartridges of the prior art, directly into a required length of casing.

If one bears in mind the great quantity of sausage units which are consumed, it will be easily understood that a great economy is achieved by not having to use the above cited "cartridges".

The straight forward design of the machine, in view of the use of a strip-like film, results in a plurality of advantages in respect of its maintenance, avoids excessive wear of the pertinent parts, and that no stresses are generated on the casings which would tend to block them on the machine, like in the prior art, where the bonded portions of a cartridge blocked many times the correct feeding of the casings.

In short the present invention relates to a sausage producing apparatus, hving a source of flowable meat mass, a tubular member connected to said source and having an ejector end for injecting said flowable meat mass into a tubular casing and a constricting assembly for constricting at short intervals the meat mass filled casing to form a string of sausages. A roll of strip-like film is provided, the film having general parallel side edges. Bending means, having an inlet end and an outlet end, surround said tubular member at an intermediate portion thereof, said inlet end being connected to said roll of strip-like film, said bending means continuously transforming said strip-like film into a tubular shape having overlapping side edges. Welding means are provided adjacent said outlet end of said bending means and facing said tubular member at the zone corresponding to said overlapping side edges to weld them, and conveying and twist-blocking means surrounding said ejector end convey, in a forward direction, the welded tubular casing towards said constricting assembly yet not allowing any twisting force exerted on said tubular casing up to said constricting assembly to progress towards said bending means. Driving means are provided for synchronically rotating, at the same rotational speed, said tubular member, bending means, welding means and conveying means about the longitudinal axis of the tubular member, thereby also rotating at the same speed the casing being formed. The constricting assembly is coaxial with said tubular member and located beyond the ejector end thereof, and has clamping jaw means successively moving along said longitudinal axis in a clamping position and adapted to retain the clamped portion of a meat mass filled casing from further rotation, thereby producing successive, spaced apart twisted gaps in between which sausages are formed and which define said spaced string of sausages.

The present invention further refers to a method for producing sausages using a strip-like film and a flowable meat mass, including the steps of providing a strip-like film which passes through a bending member capable of converting it into a tubular film with overlapping side edges, the tubular film surrounding and being moved along a meat mass conducting tubular member while the tubular member and the film are simultaneously rotated, welding the overlapping side edges to form a tubular casing whilst being rotated, injecting a flowable meat mass into the tubular film casing already welded, and successively stopping the rotation of the tubular film casing containing meat mass at successive spaced apart locations, thereby producing successive twisted gaps at such locations which define a spaced string of sausages.

For a better understanding of the present invention, reference will now be made, by way of example, to the enclosed drawing, in which a preferred embodiment is disclosed, which facilitates the comprehension of the principle of the invention.

BRIEF DESCRIPTION OF THE DRAWINGS

FIG. 1 is a side elevation of the apparatus of the invention.

FIG. 2 is a cross-section along line II—II of FIG. 1, and

FIG. 3 is a perspective view of a part of the apparatus.

DESCRIPTION OF THE PREFERRED EMBODIMENT

Referring to FIG. 1, the sausage producing apparatus 1 includes a long tubular member 2 having a front or ejector end 3 and a rear end 4. Rear end 4 is connected to a flowable meat-mass source 5, which comprises an injection pump 6 having a stationary portion 7 and a rotatory portion 8 which in turn is connected to the tubular member 2, so that tubular member 2 and rotary portion 8 are adapted to rotate together about the same longitudinal axis 24. Stationary portion 7 is connected to a conduit 9 which forwards a flowable meat-mass of any suitable kind.

Adjacent the rear end 4, a roll 10 of strip-like, heat-sealable film 11 having parallel longtitudinal side edges 12—12', is mounted on a rotatable spool 10a surrounding the tubular member 2. The strip like film 11 has a thickness of about 18μ. Spool 10a is in turn rotatably supported by a column 25a.

The roll 10 is associated with a guiding device 14 including a guiding plate 15. As better shown in FIG. 3, plate 15 has a plurality of elongated slots 16a, 16b, 16c and 16d, which change the travel direction of the film 11, in order to guide it towards bending means 17. Bending means 17 include an upwardly projecting backing and guiding plate 18, connected to said guiding device 14. Tubular member 2 projects through said plate 18. A short spiral-sectional sleeve 19 projects from said plate 18, surrounding an intermediate portion of said tubular member 2, in the direction of the longitudinal axis 24 and extends towards the front end 3. Sleeve 19 is coaxially arranged regarding tubular member 2 and the latter concentrically extends within sleeve 19. Sleeve 19 defines an inlet end 19a and an outlet end 19b. Spiral sleeve 19 defines overlapping spaced apart edge portion 20 and 21 forming a channel parallel to the longitudinal axis 24.

A second column 25b having a rotary supporting ring 23 concentrically surrounding said tubular member 2, is provided with a projecting bar 33 parallel to the axis 24 and connected to said sleeve 19 through a wing 34. Bar 33 further supports welding means 13 between said outlet end 19b and said supporting ring 23 and is coaxial to said channel formed by said edge portions 20, 21. Film 11 is unwound from roll 10 guided through slots 16a, 16b, 16c and 16d to locate it behind the backing and guiding plate 18, to then move from the inlet end 19a towards the outlet end 19b to transform the flat-strip into a tubular shape with the side edges 12, 12' in overlapping relationship. The purpose of the welding means 13 is to seal the overlapping side edges 12, 12' to form a casing 11a and to which end conveniently said welding means 13 is a skid heater which operates in combination with the periphery of the tubular member 2 in order to press-seal said side edges 12, 12' together.

Ring 23 supports at least a pair of diametrically opposite rolls 22, facing the periphery of said tubular member 2 near said front end 3.

The assembly consisting of the rotary portion 8, roll 10, guiding device 14, tubular member 2, bending means 17, welding means 13 and supporting ring 23 with its corresponding rolls 22, is thus rotatably supported by the pair of columns 25a and 25b.

To facilitate the description of the operation, this assembly hereinafter called "rotary assembly X", is schematically enclosed in a broken line box in FIG. 1. The rotary assembly X is rotated by a conventional motor 32, schematically shown in FIG. 1.

Downstream of the assembly X, a constricting assembly 31 is arranged. This constricting assembly 31 consists of two identical parts which are symmetrically arranged at each side of axis 24. Each one of these parts in turn consists of two spaced apart pulleys 29, at least one of which is a driving pulley adapted to drive an endless belt 28. Spaced apart prongs 27 defining clamping jaw means project out of each belt 28. Due to syncronized movement of the belts 28, pairs of prongs 27 sequentially face each other, acting as clamping jaws which move along axis 24, as will be later explained. The arrows M show the circulating direction of the belts 28.

Thus it can already be understood that the rotary assembly X provides the casing 11a with a rotary movement as indicated by arrow R, whilst the constricting assembly 31 provides the already meat filled casing 11b (already filled with the flowable meat mass 30), as will be later explained, with a longitudinal movement, as indicated by arrow L.

As to the operation of the apparatus 1, strip 11 is unwound from roll 10 and passed through slots, more particularly through slots 16a, 16b to assure a good unwinding and then through slot 16c where the strip is turned over 90° with reference to the direction of travel which the strip had during passing through slots 16a and 16b. Upon exiting from slot 16c, strip 11 is moved through slot 16d and bent to follow a path forming an angle of 90° with regard to the previous path, and along a plane forming also an angle of 90° with reference to the plane defined by the main portion of the guiding plate 15. Thus the film strip 11 moves along the backing plate 18 into the sleeve 19 to become there a tubular film, as previously explained. The tubular film starts to surround the tubular member 2, as it exits the outlet end 19b, where it still has spaced apart overlapping side edges 12 and 12'. It is therefore passed through the heater 13, wherein these edges 12, 12' are bonded by heat. Thus, the tubular film is now converted into a tubular casing 11a. As said casing moves forward, it passes by the rolls 22. Up to this point it is to be borne in mind that the entire assembly X with the film in shaping process turns about axis 24.

Assuming now for one moment that the start of the film when passing by the ejector end 3 of tubular member 2 is closed, needless to say that when injection of the meat-mass into the casing is started, the expelling of the meat-mass 30 into the casing 11b produces the forward movement of the film 11 and resulting casing 11b. As the closed and meat-mass filled end of the casing continues moving forward, whilst rotating about axis 24 it has sufficient self-supporting rigidity to penetrate into the space defined between both belts 28 of the constricting assembly 31, which is started to move at this very moment, so that a pair of facing prongs 27 will start to penetrate the sausage and start to form a new sausage of the string of sausages to be formed, as will be now explained in relationship to the continuous manufacturing process.

As can be seen in FIG. 1, the distance existing between each pair of pulleys 29 around which respective belts 28 runs, is such that two pairs of adjacent prongs 27 of the two belts 28 may be simultaneously in clamping relationship, thereby forming in between them a sausage 26. It will be furthermore understood that as the belts 28 move in the direction M the prongs 27 will sequentially approach the filled casing portion adjacent the ejector end 3 and progressively constrict the cased meat mass body, until both prongs of a facing pair face each other, whereby the flowable meat mass is moved in opposite directions into the respective remaining casing portions, to define the end of two adjacent sausages. The sausage which is located between two pairs of clamped jaws 27 will be moved forward along the axis 24 without rotation, while the sausage portion which is being formed adjacent the ejector end 3 has a casing portion which simultaneously turns about the axis 24, so that thereby a constricted twisted gap or knot-like portion 35 is automatically formed. This is the reason why the assembly X has to turn.

However care must be taken that this twisting effect produced at the knot portion 35 is not transferred onto the casing in formation or in other words backwards toward the bending means 17, i.e. beyond the rolls 22, because this would change the position of the overlapping side edges 12, 12' with regard to the heater 13, which would result in that the welding does not take place. Therefore the rolls 22 act as twist-block-rolls.

The arrangement hereinbefore described is therefore able to provide a continuous manufacturing of a string of sausages, the length of which depends on the length of the film roll 10.

With regard to the starting system as previously described in the direction that at the beginning of the operation the tubular casing must be closed, an alternative procedure would be to pass an empty casing through a pair of moving prongs and then to start with the ejection of the meat at the ejector end 3.

With referenct to another aspect of the invention, a method for continuously producing strings of sausages is provided. According to the method, a roll 10 of heat sealable film 11 is supplied around a tubular member 2 adapted for feeding a flowable meat-mass 30. The film 11 is wrapped around the tubular member 2 in order to have respective side edges 12, 12' of the film in overlapping relationship, whilst the film and the tubular member 2 are simultaneously rotating. Thereafter the spaced apart side edges of the film are heat bonded and the casing, now formed as a tubular casing is moved axially along the tubular member 2 to pass by the meat-mass ejector end 3, where a flowable meat-mass is supplied into the interior of the tubular film casing 11b. During the meat-mass filling, the tubular film is also continuously rotated. Thereafter the filled tubular casing is stopped to rotate, while linearly moving forward, to form at successive spaced locations, twisted gaps to thereby produce a string of sausages.

Although the essential features of the invention have been brought out by means of a preferred embodiment, the invention is not limited to this embodiment and extends on the contrary to all alternative forms within the purview of the appended claims.

I claim:

1. In a sausage producing apparatus comprising a source of flowable meat mass, a tubular member connected to said source and having an ejector end for injecting said flowable meat mass into a tubular casing and a constricting assembly for constricting at short intervals the meat mass filled tubular casing to form a string of sausages; the improvement comprising a roll of strip-like film, the film having generally parallel side edges; bending means having an inlet end and an outlet end, such bending means surrounding said tubular member at an intermediate portion thereof, said inlet end being connected to said roll of strip-like film, said bending means continuously transforming said strip-like film into a tubular shape having overlapping side edges; welding means adjacent said outlet end of said bending means and facing said overlapping side edges of said film to weld them together to form a tubular casing; conveying and twist-blocking means surrounding said ejector end of said tubular member for conveying, in a forward direction, said tubular casing towards said constricting assembly while preventing any twisting force exerted on said tubular casing by said constricting assembly from progressing towards said bending means; driving means for synchronously rotating at the same speed said tubular member, bending means, welding means and conveying means about the longitudinal axis of said tubular member, thereby also rotating the tubular casing as it is being formed; and constricting assembly being coaxial with said tubular member and located beyond said ejector end thereof and having clamping jaw means successively moving along said longitudinal axis in spaced clamping positions thereon, such clamping jaw means being adapted to retain the portion of said meat-mass filled tubular casing clamped therebetween from further rotation; whereby successive, spaced apart twisted gaps are formed in said tubular casing at such locations which define a continuous string of sausages.

2. The apparatus of claim 1, wherein said film is heat-sealable and said welding means is a heater.

3. The apparatus of claim 2, wherein said bending means comprise a spiral sectional sleeve adjacent a guiding plate having a plurality of slots for passing the strip-like film therethrough and orienting it for introducing the film into the sleeve to form it into said tubular casing having overlapping side edges.

4. The apparatus of claim 3, wherein said conveying and twist-blocking means comprise at least two, with regard to said longitudinal axis, diametrically opposite rolls, said rolls conveying the tubular casing beyond said ejector end of said tubular member and securing such casing against twisting in the zone between said sleeve and such ejector end.

5. The apparatus of claim 4, wherein said constricting assembly comprising two endless belts driven by pulleys located at opposite sides of said longitudinal axis, each belt including spaced apart transverse clamping-jaw members thereon, both belts being synchronously driven between said pulleys so that said jaw members on opposite belt portions face each other in order to clamp there-between a portion of the meat-mass containing casing.

6. A method for producing sausages by forming a strip-like film into a tubular casing and injecting a flowable meat mass into such casing, comprising the steps of: passing said strip-like film through a bending member which converts it into a tubular film with overlapping side edges, the tubular film surrounding and being moved along a tubular member conducting such meat mass while the tubular member and the tubular film are simultaneously rotated; welding the overlapping solid edges of the tubular film so as to form a tubular casing while being rotated; injecting the flowable meat mass from the tubular member into the welded tubular casing; and preventing rotation of the portion of the welded tubular casing containing the meat mass at successive spaced apart locations thereon; whereby successive twisted gaps are formed in said tubular casing at such spaced locations which define a continuous string of sausages.

* * * * *